(12) United States Patent
Zhang et al.

(10) Patent No.: US 6,461,958 B1
(45) Date of Patent: Oct. 8, 2002

(54) POLISHING MEMORY DISK SUBSTRATES WITH RECLAIM SLURRY

(75) Inventors: Jimin Zhang, San Jose; Ken Cummings, Riverside; Mike Lojero, Corona; Hector Salcedo, Oakley; Zeyang Zhou, Irvine; Buu Van, Anaheim; Shapour Bakhtiari, Milpitas, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/773,929

(22) Filed: Feb. 2, 2001

Related U.S. Application Data

(60) Provisional application No. 60/180,443, filed on Feb. 4, 2000.

(51) Int. Cl.$^7$ .......................................... H01L 21/4763
(52) U.S. Cl. ........................................ 438/626; 438/692
(58) Field of Search .................... 438/7, 16, 626, 438/691, 692, 693, 695, 747, 716, 732

(56) References Cited

U.S. PATENT DOCUMENTS

| | | | |
|---|---|---|---|
| 4,128,691 A | | 12/1978 | Shirahata et al. |
| 4,181,540 A | * | 1/1980 | Ahlf ...................... 148/6.15 R |
| 4,475,981 A | * | 10/1984 | Rea ........................... 156/636 |
| 4,696,697 A | | 9/1987 | Kitano et al. |
| 4,735,848 A | * | 4/1988 | Kondo et al. ............... 428/219 |
| 4,769,046 A | | 9/1988 | Senda et al. |
| 4,915,710 A | | 4/1990 | Miyazaki et al. |
| 4,929,257 A | | 5/1990 | Miyazaki et al. |
| 5,223,304 A | | 6/1993 | Yasuda et al. |
| 5,302,434 A | | 4/1994 | Doerner et al. |
| 5,397,397 A | * | 3/1995 | Awad ............................. 134/1 |
| 5,437,887 A | | 8/1995 | Yarkosky et al. |
| 5,441,788 A | | 8/1995 | Bloomquist et al. |
| 5,527,423 A | | 6/1996 | Neville et al. |
| 5,733,178 A | | 3/1998 | Ohishi |
| 5,750,230 A | | 5/1998 | Ishikawa et al. |
| 5,750,440 A | * | 5/1998 | Vanell et al. ............... 438/692 |
| 5,824,386 A | | 10/1998 | Laconto, Sr. et al. |
| 5,858,813 A | | 1/1999 | Scherber et al. |
| 5,861,054 A | | 1/1999 | Miyashita et al. |
| 5,866,031 A | * | 2/1999 | Carpio et al. ............... 252/79.1 |
| 5,902,172 A | * | 5/1999 | Utashiro ...................... 451/28 |
| 5,916,655 A | | 6/1999 | Kwon |
| 5,958,288 A | | 9/1999 | Mueller et al. |
| 5,968,239 A | | 10/1999 | Miyashita et al. |
| 6,007,592 A | | 12/1999 | Kasai et al. |
| 6,015,506 A | | 1/2000 | Streinz et al. |
| 6,068,787 A | | 5/2000 | Grumbine et al. |
| 6,146,244 A | | 11/2000 | Atsugi et al. |
| 6,290,736 B1 | * | 9/2001 | Evans ........................... 51/307 |
| 6,303,049 B1 | * | 10/2001 | Lee et al. .................. 252/79.1 |

FOREIGN PATENT DOCUMENTS

JP 03083862 A * 4/1991

* cited by examiner

*Primary Examiner*—Hoai Ho
*Assistant Examiner*—Phuc T. Dang
(74) *Attorney, Agent, or Firm*—McDermott, Will & Emery

(57) ABSTRACT

A process for polishing a metal surface with a polishing slurry is provided where the polishing slurry is collected and re-used in the polishing process. Embodiments of the present invention include polishing a nickel-phosphorous composition plated on an aluminum alloy memory disk substrate in a two step process where the first step includes a rough-finish polish of the nickel composition to a predetermined roughness and a where the second step includes polishing the metal coated substrate with a colloidal slurry and reclaiming the slurry for subsequent polishing.

17 Claims, No Drawings

POLISHING MEMORY DISK SUBSTRATES WITH RECLAIM SLURRY

RELATED APPLICATION

This application claims priority from provisional patent application Serial No. 60/180,443 filed Feb. 4, 2000, entitled "POLISHING MEMORY DISK SUBSTRATES WITH RECLAIM SLURRY" the entire disclosure of which is herein incorporated by reference.

FIELD OF THE INVENTION

The present invention relates generally to methods of surface treating a metal article, such as polishing a metal surface. The present invention has particular applicability in chemical mechanical polishing (CMP) of non-magnetic substrates for use in manufacturing high area 1 density magnetic recording media exhibiting low noise and high coercivity.

BACKGROUND

Various metal platings, such as nickel (Ni) platings or deposits, enjoy technological applicability in various industries, such as the electronic, oil and gas, aerospace, machinery, automobile and magnetic recording media industries. For example, electroless Ni is employed in the metal finishing industry for various metal substrates, including steel, copper, aluminum and alloys thereof. Conventional electrolessly deposited Ni—P platings exhibit desirable physical and chemical properties, such as hardness, lubricity, appearance, and corrosion resistance. An amorphous Ni—P plating is conventionally applied to a non-magnetic substrate, such as an aluminum (Al) or an Al-alloy substrate in manufacturing magnetic recording media.

Thin film magnetic recording disks and disk drives are conventionally employed for storing large amounts of data in magnetizable form. For optimum consistency and predictability, it is necessary to maintain each transducer head as close to its associated recording surface as possible, i.e., to minimize the flying height of the head. Increasing speed and capacity requirements are forcing disk drives to become smaller and the flying height of the head to be even closer to the recording medium. At ever increasingly small distances, both the head and the disk must be very flat. Thus, the material used for the disk should be very stiff and amenable to a fine finish.

A typical longitudinal recording medium comprises a non-magnetic substrate, typically made of an aluminum (Al)-alloy, such as an aluminum-magnesium (Al—Mg)-alloy, plated with a continuous layer of amorphous nickel-phosphorus (NiP) substantially over the substrate. In completing the fabrication of a magnetic disk, a magnetic layer is typically sequentially deposited on each side of the nickel alloy. A protective overcoat layer and a lubricant topcoat are typically sequentially formed on the magnetic layer to complete the fabrication of the magnetic recording medium.

To provide the current smoothness required for a high areal density magnetic recording media exhibiting low noise and high coercivity, various layers on the substrate require polishing. For example, a polished Ni—P plating increases the hardness of the Al substrate, and serves as a suitable surface to provide a texture, which is substantially reproduced on the disk surface.

Conventional techniques for treating various metal surfaces, such as Al, Ni and Ni—P, include CMP for polishing and smoothening the surface of the metal. In conventional CMP techniques, a carrier assembly is rotated in contact with a polishing pad in a CMP apparatus. The polishing pad is mounted on a rotating turntable or platen, or moving above a stationary polishing table, driven by an external driving force. The metal coated substrates are typically mounted on the carrier or polishing head which provides a controllable pressure urging the substrate against the rotating polishing pad. Thus, the CMP apparatus effects polishing or rubbing movement between the substrate and the polishing pad while dispersing a polishing slurry, typically containing abrasive particles in a reactive solution typically comprising an oxidizer, to effect both chemical activity and mechanical activity while applying a force between the substrate and a polishing pad.

It is, however, extremely difficult to smoothen a hardened non-magnetic substrate without encountering severe surface defects, such as surface roughness, scratches and pitting. These surface defects are virtually impossible to recover without the expenditure of an inordinate, prohibitive amount of polishing time. Conventional smoothening methodology, therefore, cannot provide a non-magnetic substrate with a hardened surface having an average surface roughness (Ra) less than 4 Å to 5 Å.

Accordingly, a continuing need exists a for methodology enabling surface treatment, such as CMP, of metal surfaces with reduced defects and enhanced production throughput. There exists a particular need for methodology enabling the manufacture of magnetic recording media comprising a non-magnetic substrate having a smoothened surface.

DISCLOSURE OF THE INVENTION

An advantage of the present invention is an efficient method for surface treating a metal with reduced surface defects.

Another advantage of the present invention is a method of manufacturing a magnetic recording media comprising CMP the surface of a non-magnetic substrate with reduced surface defects and enhanced production throughput.

According to the present invention, the foregoing and other advantages achieved by a method of polishing a substrate having a metal surface. The method includes polishing a non-magnetic, metal coating, such as a nickel or nickel alloy, on a substrate suitable for the production of a magnetic recording medium. The method comprises: polishing a surface of the metal on the substrate with a colloidal slurry to reduce surface roughness; collecting the colloidal slurry used in polishing the surface of the metal; and combining unused colloidal slurry with the collected colloidal slurry to form a mixed slurry.

Embodiments of the present invention include polishing the surface of the metal on the substrate to a predetermined roughness with a non-colloidal polishing slurry prior to polishing the surface of the metal on the substrate with the colloidal slurry; collecting the colloidal slurry in a collection tank; separating the colloidal slurry from any settled metal residue and then adding the unused colloidal slurry to the separated colloidal slurry to form the mixed slurry and using the mixed slurry to polish additional metal surfaces.

The colloidal slurry of the present invention comprises an abrasive, with or without additional agents, dispersed in a medium. In an embodiment of the present invention, the colloidal slurry comprises abrasive particles having an average size of less than 1 micron dispersed in an aqueous medium with an oxidizing agent.

Another aspect of the present invention is a method of polishing substrates having a metal surface, the method comprising: polishing a first metal surface on a first substrate with a colloidal slurry to reduce surface roughness on the first metal surface of the first substrate; collecting the colloidal slurry used in polishing the first metal surface of the first substrate; and polishing a second substrate having a second metal surface with the collected colloidal slurry to reduce surface roughness on the second metal surface of the second substrate.

Embodiments include polishing both first and second metal surfaces each for about several seconds to about several minutes with the colloidal slurry and a CMP pad to an average surface roughness (Ra) of about 1.5 Å to about 3 Å; rinsing the polished surfaces with water; and drying the polished surfaces. A magnetic recording medium can then be fabricated from the polished substrate by forming a magnetic layer on the polished metal surface; forming a protective overcoat on the magnetic layer; and forming a lubricant topcoat on the protective overcoat.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its details are capable of modifications in various obvious respects, all without departing from the present invention. Accordingly, the description is to be regarded as illustrative in nature, and not as restrictive.

DESCRIPTION OF THE INVENTION

The present invention provides a facile method of polishing metal surfaces and is particularly applicable in providing a non-magnetic substrate having a hardened surface layer with reduced defects and a low surface roughness, e.g. about 2 Å to 3 Å in an economical manner.

The present invention relates to a method for polishing rigid disks, such as metal coated substrate for the production of magnetic recording media, using an abrasive dispersion alone or combined with additives including, for example, at least one oxidizer to provide a colloidal slurry. A colloid as used herein refers to a suspension of particles in a medium having an individual or aggregate size of about one millimicron (nanometer) to about one micron (micrometer).

A colloidal slurry as used herein refers to a colloid of abrasive particles in a polishing medium as currently known, or future equivalents thereto, in the CMP arts. In embodiments of the present invention the abrasive particles in the colloidal slurry average less than 1 micron in diameter, e.g. approximately 0.1 micron to about 0.23 micron in diameter.

The abrasive can be incorporated into an aqueous medium of the polishing slurry as a concentrated aqueous dispersion of metal oxides, which concentrated aqueous dispersion of metal oxide abrasives typically ranges from about 3% to about 45% solids, and preferably between 10% and 20% solids. The aqueous dispersion of metal oxides can be produced utilizing conventional techniques, such as slowly adding the metal oxide abrasive to an appropriate media, for example, deionized water, to form a colloidal dispersion. The dispersion is typically completed by subjecting it to high shear mixing conditions known to those skilled in the art. The pH of the slurry may be adjusted away from the isoelectric point to maximize colloidal stability. In an embodiment of the present invention the pH of the colloidal is adjusted to be acidic, i.e., having a pH of less than 7.

The metal oxide abrasive useful in the method of polishing a metal surface in accordance with the present invention comprises metal oxide aggregates or individual single sphere particles. The term "particle" as it is used herein refers to both aggregates of more than one primary particle and to single particles. The metal oxide particles useful in the methods and compositions of this invention will have a size distribution less than about 1.0 micron, a mean individual or aggregate diameter less than about 0.5 micron and a force sufficient to repel and overcome the van der Waals forces between the abrasive aggregates or individuals particles themselves. Such metal oxide abrasives have been found to be effective in minimizing or avoiding scratching, pit marks, divots and other surface imperfections during polishing of rigid disks. The particle size distribution in the present invention may be determined utilizing known techniques such as transmission electron microscopy (TEM). The mean particle diameter and mean refers to the average equivalent spherical diameter when using TEM image analysis, i.e., based on the cross-sectional area of the particle. By force is meant that either the surface potential or the hydration force of the metal oxide particles must be sufficient to repel and overcome the van der Waals attractive forces between the particles.

Useful metal oxide abrasive comprise alumina, titania, zirconia, germania, silica, ceria mixtures thereof and chemical admixtures thereof. The term "chemical admixture" refers to particles including atomically mixed or coated metal oxide abrasive mixtures. The dispersion useful in the method of this invention preferably includes from about 0.5 to about 55.0 weight percent or more of an abrasive. It is more preferred, however, that the dispersion and/or the CMP slurry of this invention is diluted at the point of use with deionized water or any other acceptable diluent to produce a dispersion with less than 12 wt %, preferably less than about 6.0 wt % abrasive when the abrasive is alumina, less than about 10.0 wt % abrasive when the abrasive is silica, and most preferably from about 3.0 to about 6.0 weight percent abrasive. The term "point of use" refers to the location where the dispersion is used which, in the case of a rigid disk, would be the surface of a rigid disk undergoing polishing.

Additional components can be added to the colloidal slurry as for example at least one oxidizer. Useful oxidizers include, for example, peroxy compounds, e.g. compounds which may disassociate through hydroxy radicals, such as hydrogen peroxide and its adducts such as urea hydrogen peroxide and percarbonates, organic peroxides such as benzoyl peroxide, peracetic acid, and di-t-butyl peroxide, monopersulfates, dipersulfates, sodium percarbonate and sodium peroxide. The oxidizing agent can also be an inorganic or a compound containing an element in its highest oxidation state. The oxidizing agent may be present in a chemical mechanical polishing slurry in an amount ranging from about 0.01 to about 50.0 weight percent, e.g. from about 0.01 to about 10.0 weight percent.

Other well known polishing slurry additives may be incorporated alone or in combination into the colloidal slurry useful in the process of this invention. A non-inclusive list is inorganic acids, catalysts, organic acids, surfactants, alkyl ammonium salts or hydroxides, dispersing agents, stabilizers, abrasion accelerators, film forming agents, etc. or their equivalents.

Many colloidal slurries are commercially available, as for example, Lustra™ 2090—Second Step Ultra Polishing Slurry For Rigid Disk Substrates available from Cabot Microelectronics, located in San Jose California. The colloidal slurries useful in the present inventive methods achieve high surface finish as measured by both surface roughness (less than 0.2 nm) and surface defectivity (virtually microscratch and micropit free). Under standard polishing conditions, the colloidal slurry useful in the present methods achieve a good removal rate.

Surfaces suitable for planarization and/or polishing in accordance with the present invention include various metallic articles or metallic surfaces, such as electroless nickel platings deposited employing a conventional electroless nickel plating compositions. Electroless Ni plating compositions generally comprise four ingredients dissolved in a solvent, typically water. These ingredients include: (1) a source of Ni ions; (2) a reducing agent, such as a hypophosphite or an amine borane; (3) an acid or hydroxide pH adjuster to provide a suitable pH; and (4) a complexing agent for metal ions sufficient to prevent their precipitation in solution. Such suitable complexing agents are well known in the art. Accordingly, upon employing a hypophosphite as the reducing agent, the deposit will contain Ni and P. On the other hand, if an amine borane is employed, the deposit will contain Ni and boron.

In practicing embodiments of the present invention, a non-magnetic, metal layer is formed on a substrate useful in the production of rigid magnetic media. Typically, the non-magnetic, metal layer substantially covers one or more surfaces of the substrate. In an embodiment of the present invention, a non-magnetic nickel or nickel alloy layer is formed by depositing an electroless Ni—P layer on a non-magnetic substrate, such as Al, an Al alloy, or an alternative substrate such as a glass, glass-ceramic, or ceramic material. The Ni—P layer can be heated at an elevated temperature, i.e., baked, for improved hardness and corrosion resistance. Subsequently, CMP is performed in an attempt to provide a smooth surface prior to texturing and sputter depositing layers thereon to form a magnetic recording medium.

Metal surfaces such as nickel-plated blanks for rigid memory discs are polished with the above described compositions by subjecting the surface to mechanical rubbing (polishing) in the presence of the composition. The rubbing effects mechanical smoothing or wear of the surface which is aided by the abrasive, promoted by the components when added to the abrasive to give a chemical mechanical polishing slurry which chemically attacks and dissolves the components comprising the disk metal surface. Polishing may thus by achieved solely by a mechanical mechanism, or by a combination of chemical and mechanical mechanisms.

The mechanical rubbing or polishing is conveniently effected by contacting one or both of the rigid disk surfaces with CMP polishing pads under a predetermined compressive force with relative motion between the pad and the surface. The resulting dynamic friction between the pad and the surface causes the desired wear and smoothing of the disk surface. The relative motion is preferably achieved through rotation of either or both the disk surface and the pad. Commercially available polishing pads that are used to polish glass or wafers in the electronics industry may be used. These pads are typically composed of a microporous polymer such as polyurethane foam, optionally backed with a substrate such as felt, latex filled felt, dense polyurethane, or latex. The coefficients of friction of the surfaces of those pads vary and it is within the scope of the invention to carry out the process using a multiplicity of stages (e.g., rough polish followed by a finish polish) using pads having different coefficients of friction. For instance when the process involves a rough polish stage followed by a finish polish stage, the pad used in the finish polish stage has a lower coefficient of friction than the pad used in the rough polish stage. Commercially available CMP pads can be obtained from Rodel of Phoenix Arizona.

The polishing machines that are used to polish silicon wafers and the like in the electronics industry may be adapted for use in polishing the plated rigid disc blanks. A commercially available polishing apparatus is available, for example, from SpeedFam-IPEC of Chandler Arizona. These machines basically consist of a pair of platens. One of the platens carries a rack on which one or more rigid discs may be mounted. The other platen carries a driven rotatable plate on which the polishing pad is mounted. The machine includes means for controlling the pressure between the platens, means for controlling the temperature of the platens, and means for injecting one or more fluids into the interface between the platens. In an embodiment of the present invention, a Wittig polisher developed by Seagate Technologies, Inc. of Anaheim California is used to polish a Ni—P coated aluminum substrate.

Rigid disk polishing can be accomplished in one or two steps. In an embodiment of the present invention, the polishing compound is successively provided with a smaller size of the particle diameter in first and second polishing steps so as to polish the surface. Thus, in the first polishing step, the surface is rapidly polished and the waviness is removed at the same time together with other major defects.

In the first step, an abrasive dispersion or chemical mechanical polishing slurry is applied to the rigid disk surface with a pad in order to quickly remove a portion of the disk surface layer by mechanical abrasion to give a rigid disk with an abraded surface. In an embodiment of the present invention, the slurry used in the first step is not colloidal, i.e. the abrasive particles are larger than one micron, to enhance polishing speed and throughput. In an embodiment of the present invention the first polishing step comprises rough polishing a nickel plated substrate comprising aluminum with a non-colloidal polishing slurry with a polishing pad for about several seconds to about two minutes to a predetermined roughness, i.e. higher than the final finish.

It has been recognized, however, that to achieve even higher surface smoothness, a slower removal rate colloidal polishing slurry can be used in a second polishing step. In accordance with the present invention, the second polishing step comprises polishing the surface of a metal on the substrate with a colloidal slurry to reduce surface roughness, e.g. to achieve a fine finish having an average surface roughness (Ra) of about 1.5 Å to about 3 Å. The second step can be accomplished by employing a colloidal slurry comprising colloidal alumina and an oxidant with a polyurethane CMP polishing pad on a polishing apparatus for about several seconds to about two minutes. After the second step polishing process is complete, the polished surface is rinsed with water; and dried.

Through experimentation it has been surprisingly discovered that the colloidal slurry can be reused in the second step polishing process. It is believed that the reuse, although a simple process, is contrary to conventional practices where it believed that only virgin, unused colloidal slurry, is appropriate in polishing metal surfaces to a fine finish. The belief being that used colloidal slurry will increase contamination and be less effective in polishing the metal surface.

In practicing the present invention, the colloidal slurry used in polishing the surface of the metal is collected, as in a collection container or tank and subsequently combined with fresh, unused colloidal slurry to form a mixed slurry composition. The pH of the mixed slurry composition can be adjusted at this time with conventional acids, bases or buffers to maintain the desired pH of the mixture. In an embodiment of the present invention, the collected colloidal slurry is separated from any precipitated metal, e.g., any settled metal residue, as by decanting the collected colloidal slurry prior to preparing the mixture.

A mixed colloidal slurry composition can be prepared by combining 1 part unused colloidal slurry to 10 parts of the collected colloidal slurry to form the mixed slurry and adjusting the pH of the mixture to acidic, e.g. adjusting the pH of the mixed slurry to a pH of about 3 to about 4. Additional metal surfaces can then be polished, as by the second polishing step, with the mixed colloidal slurry composition, i.e. a recolloidal process. Consequently, the resulting surface after CMP exhibits substantially reduced defects and an Ra of about less than 3 Å, with an attendant increase in production throughput yield and cost earnings.

In a comparative experiment nickel-phosphorous coated aluminum alloy substrates having the thicknesses shown in the Tables were polished by the recolloidal process of the present invention and compared to a polishing process that differed only in that the comparative polishing process employed solely unused colloidal slurry. The results are presented in Tables 1 and 2.

TABLE 1

| Recolloidal Process | Ni ($\mu$) | Removal (g) | Ra (Å) | Removal rate ($\mu$/min) |
|---|---|---|---|---|
| Batch 1 Sample size 10–500 | 419 ± 20 | 0.026 ± 0.004 | 1.73 ± 0.19 | — |
| Batch 2 Sample size 27–500 | 423 ± 18 | 0.029 ± 0.003 | 1.94 ± 0.45 | — |
| Batch 3 Sample size 10–500 | 420.5 ± 23 | 0.027 ± 0.005 | 1.81 ± 0.214 | 3.36 ± 0.79 |

TABLE 2

|  | Recolloidal process | Control process |
|---|---|---|
| Batch 1 Disks with acceptable quality | 91.6% | 90.6% |
| Batch 2 Disks with acceptable quality | 88.8% | 89.0% |
| Batch 3 Disks with acceptable quality | 89.3% | 88.9% |

From the results of the experiments it is apparent that the recolloidal process of the present invention provides a finished polished metal surface as good as, if not slightly better than, using solely unused colloidal slurry in the second step of a two-step polishing process.

After the finish polishing step, a magnetic layer can be formed on the polished metal surface as is known in the art. On the magnetic layer is formed a protective overcoat and a lubricant topcoat is typically formed on the protective overcoat as is conventionally known to complete the production of a magnetic recording medium. Magnetic recording media in accordance with the present invention can comprise any conventional substrate, such as Ni—P/Al or an Ni—P/Al alloy substrate, Al or an Al alloy substrate, or a glass, ceramic, glass-ceramic or polymeric substrate. The present invention can be implemented employing any of the various seedlayers, underlayers, magnetic layers and lubricant topcoats conventionally employed in manufacturing magnetic recording media. For example, embodiments of the present invention comprise the use of a Cr or Cr alloy underlayer or underlayers, Co-alloy magnetic layers and PFPE lubricants for enhance durability.

The present invention enables efficient surface treatment, e.g., smoothening, of various metallic articles and metallic surfaces, such as Al, Ni, and Ni—P, by a recolloidal polishing process. The present invention enjoys industrial applicability in manufacturing any of various types of metallic articles or articles with metallic surfaces, particular magnetic recording media, including thin film disks. The present invention is particularly applicable in producing high areal recording density magnetic recording media requiring a low flying height.

In the previous description, numerous specific details are set forth, such as specific materials and processes, to provide a better understanding of the present invention. However, the present invention can be practiced without resorting to the details specifically set forth. In other instances, well known materials and techniques have not been described in detail in order not to unnecessarily obscure the present invention.

Only certain embodiments of the present invention and but a few examples of its versatility are shown and described in the present disclosure. It is to be understood that the present invention is capable of use in various other combinations and environments and is capable of changes and modifications within the scope of the inventive concept as expressed herein.

What is claimed is:

1. A method of polishing a substrate having a metal surface, the method comprising:

polishing a surface of the metal on the substrate with a colloidal slurry to reduce surface roughness;

collecting the colloidal slurry used in polishing the surface of the metal;

combining unused colloidal slurry with the collected colloidal slurry to form a mixed slurry; and using the mixed slurry to polish a metal surface of another substrate.

2. The method according to claim 1, comprising adjusting the pH of the mixed slurry to a pH of about 3 to about 4.

3. The method according to claim 1, comprising collecting the colloidal slurry in a container; separating the colloidal slurry from any settled metal residue and then adding the unused colloidal slurry to the separated colloidal slurry to form the mixed slurry.

4. The method according to claim 1, comprising polishing the surface of the metal on the substrate with a colloidal slurry comprising an abrasive and an oxidizing agent in an aqueous medium.

5. The method according to claim 1, comprising polishing the surface of the metal on the substrate to a predetermined roughness prior to polishing the surface of the metal on the substrate with the colloidal slurry.

6. The method according to claim 1, comprising:

polishing the surface of the metal on the substrate with the colloidal slurry together with a CMP pad for about several seconds to about two minutes;

rinsing the polished surface with water; and drying the polished surface.

7. The method according to claim 1, comprising polishing the surface of the metal to an average surface roughness (Ra) of about 1.5 Å to about 3 Å.

8. The method according to claim 1, comprising polishing a phosphorous containing nickel surface as the metal surface on the substrate.

9. The method according to claim 1, wherein the substrate comprises aluminum or alloy for the production of a memory disk.

10. The method according to claim 1, comprising polishing the metal surface with a colloidal slurry comprising particles having an average size of less than 1 micron.

11. The method according to claim 1, comprising combining 1 part unused colloidal slurry to 10 parts of the collected colloidal slurry to form the mixed slurry.

12. The method according to claim 1, comprising:

forming a magnetic layer on the metal surface;

forming a protective overcoat on the magnetic layer; and forming a lubricant topcoat on the protective overcoat.

13. A method of polishing substrates having a metal surface, the method comprising:

polishing a first metal surface on a first substrate with a colloidal slurry to reduce surface roughness on the first metal surface of the first substrate;

collecting the colloidal slurry used in polishing the first metal surface of the first substrate; and polishing a second substrate having a second metal surface with the collected colloidal slurry to reduce surface roughness on the second metal surface of the second substrate.

14. The method according to claim 13, comprising adding unused colloidal slurry to the collected colloidal slurry to form a mixed slurry prior to polishing the second substrate.

15. The method according to claim 14, wherein both first and second metal surfaces comprise a nickel alloy and the substrate comprises aluminum.

16. The method according to claim 15, comprising:

polishing both first and second metal surfaces each for about several seconds to about several minutes with the colloidal slurry together with a CMP pad;

rinsing the polished surfaces with water; and drying the polished surfaces.

17. A method of polishing a nonmagnetic, metal coated substrate, the method comprising:

forming a nonmagnetic, metal coating on a substrate; and means for polishing the nonmagnetic, metal coating.

* * * * *